US008563620B2

(12) United States Patent
Bouazaoui et al.

(10) Patent No.: US 8,563,620 B2
(45) Date of Patent: Oct. 22, 2013

(54) HIGH PURITY SILICA MONOLITHS AND PROCESS FOR THE SYNTHESIS THEREOF

(75) Inventors: Mohamed Bouazaoui, Villeneuve-d'Ascq (FR); Bruno Capoen, Lesquin (FR); Hicham El-Hamzaoui, Lille (FR); Laurent Bigot, Hellemmes (FR); Géraud Bouwmans, Lille (FR)

(73) Assignees: Universite des Sciences et Technologies de Lille, Cedex (FR); Centre National de la Recherche Scientifique (CNRS), Cedex (FR)

( * ) Notice: Subject to any disclaimer, the term of this patent is extended or adjusted under 35 U.S.C. 154(b) by 206 days.

(21) Appl. No.: 13/123,350

(22) PCT Filed: Oct. 1, 2009

(86) PCT No.: PCT/FR2009/001177
§ 371 (c)(1),
(2), (4) Date: Apr. 8, 2011

(87) PCT Pub. No.: WO2010/040910
PCT Pub. Date: Apr. 15, 2010

(65) Prior Publication Data
US 2011/0201714 A1 Aug. 18, 2011

(30) Foreign Application Priority Data
Oct. 9, 2008 (EP) .................................... 08370021

(51) Int. Cl.
*C03B 19/12* (2006.01)
*C03C 3/06* (2006.01)
(52) U.S. Cl.
USPC ................ 521/61; 521/62; 521/64; 521/154; 65/17.1; 65/17.2; 264/612; 264/651
(58) Field of Classification Search
USPC ............ 65/17.1, 17.2; 264/612, 651; 521/61, 521/62, 64, 154
See application file for complete search history.

(56) References Cited

U.S. PATENT DOCUMENTS

| 4,851,150 A | * | 7/1989 | Hench et al. ................... 516/111 |
| 5,141,786 A | * | 8/1992 | Shimizu et al. .............. 428/34.5 |
| 5,207,814 A | * | 5/1993 | Cogliati et al. ................. 65/396 |
| 6,410,631 B1 | | 6/2002 | Oh | |
| 2001/0003910 A1 | | 6/2001 | Oh et al. | |
| 2003/0078153 A1 | | 4/2003 | Wang et al. | |
| 2006/0079387 A1 | | 4/2006 | Costa et al. | |

FOREIGN PATENT DOCUMENTS

| EP | 0385753 | 9/1990 |
| FR | 2 333 628 A | 7/1977 |
| GB | 2 346 141 | 8/2000 |
| JP | 61 201627 A | 9/1986 |
| KR | 2030022953 | 3/2003 |
| KR | 2030022957 | 3/2003 |
| WO | WO 2004/083144 A | 9/2004 |

OTHER PUBLICATIONS

International Search Report and Written Opinion of the ISA for PCT/FR2009/001177, ISA/EP, Rijewijk, NL, mailed Dec. 30, 2009.
European Search Report for priority application EP 08 370021.1, Munich, established Dec. 23, 2008.

* cited by examiner

*Primary Examiner* — Irina S Zemel
(74) *Attorney, Agent, or Firm* — Harness, Dickey & Pierce, P.L.C.

(57) ABSTRACT

The process for the synthesis of a silica monolith comprises the following steps:
  hydrolysis of a silicon alkoxide in order to form a hydrolysis precursor followed by a condensation of said hydrolysis precursor in the presence of an organic solvent, in the presence of water and of a basic catalyst in order to form oligomeric clusters containing several silicon atoms;
  dispersion of said oligomeric clusters in a solution in order to form a sol;
  polymerization of the sol in order to obtain a gel via a first heat treatment, at a temperature below the boiling point of the constituents of the sol;
  drying of the gel via a second heat treatment;
  conversion of the gel to a xerogel via a third heat treatment;
  dehydration and densification of the xerogel until the silica monolith is obtained via a fourth heat treatment.

15 Claims, 4 Drawing Sheets

HIGH PURITY SILICA MONOLITHS AND PROCESS FOR THE SYNTHESIS THEREOF

CROSS-REFERENCE TO RELATED APPLICATIONS

This application is a 371 U.S. National Stage of International Application No. PCT/FR2009/001177, filed Oct. 1, 2009. This application claims priority to European Patent Application No. 08 370021.1, filed Oct. 9, 2008. The entire disclosures of the above applications are incorporated herein by reference.

OBJECT OF THE INVENTION

The present invention relates to a high purity silica monolith and to a sol/gel synthesis process for this type of monoliths. These monoliths may for example be used for optical applications, such as the manufacturing of optical fibers.

STATE OF THE ART

Applications requiring the use of high purity silica glasses are increasingly common. In particular, these types of glasses are required for many optical applications, such as optical fibers, laser technologies, etc. They should have minimum absorbance and diffusivity in the wavelengths used. In this context, the homogeneity and purity are key parameters dominating these properties.

Traditionally, these types of glasses are produced by melting natural quartz or synthetic silicas in crucibles at a high temperature (1,700-2,000° C.). Nevertheless, this type of process suffers from many drawbacks, such as the impurity level of the initial material, the contamination by the crucible, the residual stresses due to solidification, etc.

Another method consists of depositing glass from gas precursors such as $SiCl_4$. These precursors are decomposed at high temperature and in the presence of oxygen. Document FR2333628 describes such a method using a flame. The drawback of this type of method is that it generally requires considerable investments, complex gas mixtures and very specialized nozzle geometries in order to specifically control the behavior of the flame used for the deposition.

An alternative to these processes is the use of the sol/gel type processes, in particular via the so-called <<polymeric>> or <<direct>> route, this type of process is based on chemical reactions of hydrolysis and condensation for forming gels (and subsequently glasses) from molecular precursors. The first step therefore consists in preparing a solution from metal precursors in the form of salts or organometallic compounds (generally alkoxides of formula $M(OC_nH_{2n+1})_4$. This solution is the centre of two successive reactions which are hydrolysis and condensation. The hydrolysis of a silicon alkoxide of the type $M(OC_nH_{2n+1})_4$ may be written in the general case:

$$Si(OR)_4 + H_2O \rightleftharpoons HOSi(OR)_3 + ROH \qquad (Eq.\ 1)$$

wherein R designates the alkyl group $C_nH_{2n+1}$.

Depending on the amount of water and of catalyst (acid or base), the hydrolysis is either partial or total. When the hydrolysis concerns all the groups of the alkoxide, it will be written as:

$$Si(OR)_4 + 4H_2O \rightleftharpoons Si(OH)_4 + 4ROH \qquad (Eq.\ 2)$$

Two alkoxide molecules of the $Si(OC_nH_{2n+1})_4$ type partly hydrolyzed into $HO-Si(OC_nH_{2n+1})_3$ may establish a siloxane bridge by a concentration reaction with release of water (Eq. 3) (homocondensation) or of alcohol (heterocondensation) (Eq. 4).

$$(OR)_3Si-OH + HO-Si(OR)_3 \rightleftharpoons (OR)_3Si-O-Si(OR)_3 + H_2O \qquad (Eq.\ 3)$$

or $$(OR)_3Si-OR + HO-Si(OR)_3 \rightleftharpoons (OR)_3Si-O-Si(OR)_3 + ROH \qquad (Eq.\ 4)$$

The condensation reactions lead to the polymerization of the hydrolyzed precursor and, consequently to the formation of oligomeric clusters containing several silicon atoms. These reactions are catalyzed by acids or bases. Nevertheless, the reaction rates are very different depending on the pH of the medium. In particular in an acid medium, hydrolysis is promoted relatively to condensation.

These clusters are dispersed in a liquid and thereby form the <<sol>>. The agglomeration of these clusters leads to the formation of the solid lattice of the gel. This gel subsequently undergoes several drying and ageing steps. The gel obtained after drying, called a <<xerogel>>, is a porous material, in this case a porous silica, with silanol groups (Si—OH) at the surface. These pores also allow physical adsorption of molecules, atoms or ions. The size of the pores depends on the synthesis and drying conditions.

Finally, in a last step, the xerogel is densified by a baking step at high temperature for obtaining a glass.

Document U.S. Pat. No. 7,125,912 describes in detail such a method in an acid medium. This document mainly attempts to reduce the homogeneity problems produced by the preparation method of the sol. This document proposes the preparation of the sol at a low temperature, so that the hydrolysis and condensation reactions only begin once the sol is homogeneous. This procedure is particularly useful in the case of synthesis in an acid medium, where kinetics are faster.

A significant limitation of this type of method is due to the control of the porosity, and, depending on the latter, the drying kinetics will be more or less fast. These drying kinetics are also related to the dimensions of the produced gels.

OBJECTS OF THE INVENTION

The present invention aims at providing a high purity silica monolith from a sol-gel type process. It also aims at a process for obtaining this type of monolith.

More generally, the present invention aims at improving the properties of glasses produced according to the sol-gel process, as well as of the intermediates used for achieving this. These improvements will become more clearly apparent in the detailed description of the invention.

SUMMARY OF THE INVENTION

The present invention discloses a synthesis method for a silica monolith according to a so-called <<sol-gel>> process including the following steps:
- hydrolysis of a silicon alkoxide in order to form a hydrolyzed precursor followed by condensation of said hydrolyzed precursor in the presence of an organic solvent, in the presence of water and of a basic catalyst in order to form oligomeric clusters containing several silicon atoms;
- dispersion of said oligomeric clusters in a solution in order to form a sol;
- polymerization of the sol in order to obtain a gel by a first heat treatment, at a temperature below the boiling temperature of the constituents of the sol;

drying the gel by a second heat treatment including exposure of the gel to about 90° C. for at least 24 hours followed by an increase in temperature in vacuo between about 90° C. and about 180° C., said increase in temperature being comprised between 0.1° C./min and 5° C./min;

transformation of the gel into xerogel by a third heat treatment, said heat treatment including a hold at a drying temperature comprised between 850 and 1,000° C. for at least one hour;

dehydration and densification of the xerogel until a silica monolith is obtained by a fourth heat treatment, said fourth heat treatment comprising a hold at a temperature above 1,100° for at least one hour.

According to preferred embodiments of the invention, the method includes at least one, or any suitable combination of the following characteristics:

the shape of the silica monolith is set at the step for polymerization of the sol;
said basic catalyst includes $NH_4OH$;
the silicon alkoxide is selected from tetraethyloxysilane and tetramethyloxysilane;
the organic solvent is selected from ethanol and methanol;
the solution further includes a drying additive comprising dimethylformamide;
the constituents for forming the sol are present in the proportions: metal alkoxides/organic solvent/$H_2O$/dimethyl-formamide/$NH_4OH$ of 1/4/2/1/0.005;
the second heat treatment further comprises a hold at about 180° C. in vacuo for at least 120 hrs;
the third heat treatment further comprises a temperature increase ramp from about 180° C. until dehydration and densification of the xerogel, said temperature increase being comprised between 1 and 50° C./min;
the fourth heat treatment includes a purging step which is accomplished in the presence of a mixture of $O_2/Cl_2$, and a vitrification step in the presence of helium;
the fourth heat treatment comprises a ramp of at least 1° C./min between said drying temperature and said dehydration and densification temperature;
the fourth heat treatment further comprises a hold at a constant temperature of about 1,300° C. for at least one hour;
the xerogel has an average porosity between 5 nm and 23 nm;
the xerogel has an average porosity of 5 nm when the latter is obtained from tetramethyloxysilane;
the xerogel has an average porosity of 23 nm when the latter is obtained from tetraethyloxysilane.

The invention also discloses a silica monolith obtained by the method of the invention, having a concentration of —OH groups of less than 1 ppm.

Moreover, the invention also discloses a use of the monolith according to the invention for making optical fibers.

SHORT DESCRIPTION OF THE FIGURES

FIG. 1 illustrates the distribution curves of the pore sizes of the xerogels of Examples 1 (▲) and 2(■), as well as the distribution after a treatment in vacuo at 180° C. (●) of samples 1 and 2.

FIG. 2 illustrates the distribution curves of the pore sizes of the xerogels of Examples 3 (▲) and 4 (■), as well as the distribution after treatment in vacuo at 180° C. (●) of samples 3 and 4.

DETAILED DESCRIPTION OF THE INVENTION

Figure 1:
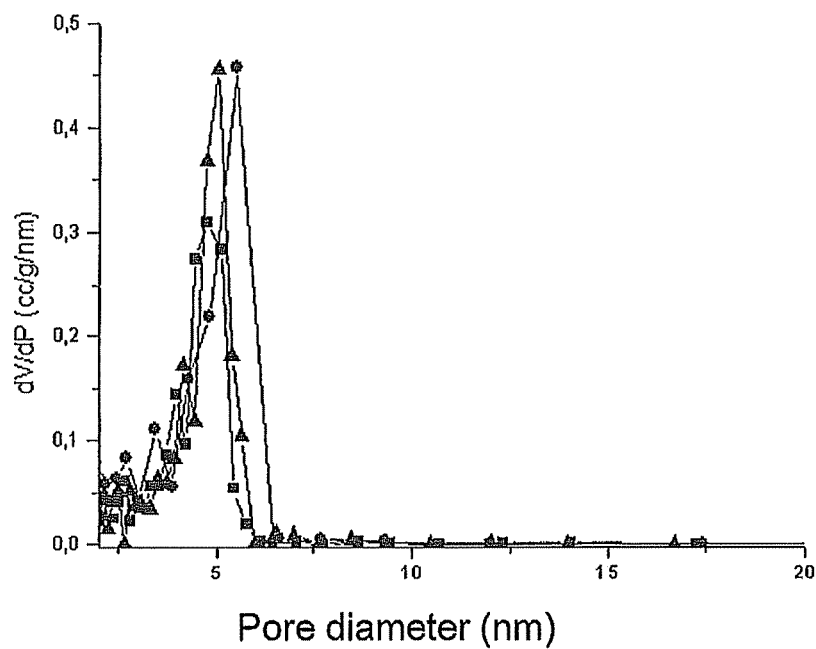
Figure 2:
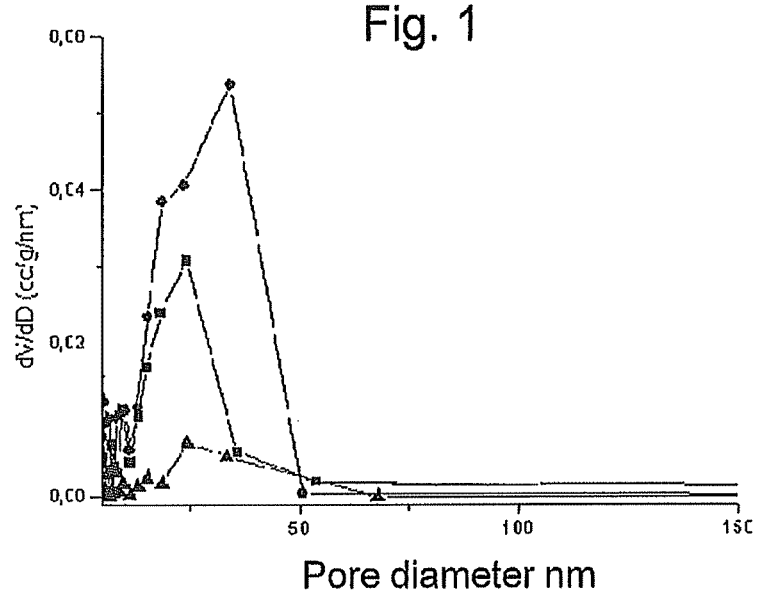

The process for producing a silica glass according to the present invention comprise 5 main steps:

the preparation of a sol comprising at least one silicon alkoxide, at least one catalyst, water, optionally an organic solvent and a drying additive;
the polymerization of the sol produced in step 1, until a gel is obtained by means of the first heat treatment;
the drying of the gel in a second heat treatment also allowing better discharge of volatile organic contaminants;
the transformation of the gel into xerogel by a third heat treatment;
the dehydration and densification of the xerogel, until the sought glass is obtained by a fourth heat treatment.

In the present invention, the second heat treatment was improved in order to allow better drying and more extensive removal of the organic residues.

In preferred embodiments of the invention, the composition of the sol, the polymerization parameters of the <<gel>> have also been improved.

The preparation of the sol of the present invention uses tetramethylorthosilane (TMOS) or tetraethylorthosilane (TEOS) as precursors.

In a preferred embodiment of the present invention, the produced sol has a basic pH. In this case, $NH_4OH$ is well adapted to the catalysis of gelling reactions.

Preferably, the organic solvent will be selected from the group of alcohols. Methanol or ethanol may for example be used.

Among the drying additives, N,N-dimethylformamide (DMF) is preferred.

In an embodiment of the invention, the hydrolysis ratio $Rh=[H_2O]/[Si]$ is comprised between 1.5 and 4; the alcohol/alkoxide ratio $RS=[alcohol]/[Si]$ is comprised between 2 and 5; the DMF/alkoxide ratio Rd is comprised between 1 and 3 and the catalyst/alkoxide ratio Rc is comprised between 500 and 20,000 ppm, which corresponds to a pH comprised between 9.2 and 11.3.

During the first heat treatment, these sols are placed in closed receptacles (or containers) of any shape, for example cylindrical or parallelepipedal. These receptacles will determine the final shape of the monolith. These containers are placed in an oven at a temperature below the boiling temperature of water and of the solvents, for example at 50° C., and, for a period of several weeks, four weeks for example. At the end of this period, the gel is formed.

During the second heat treatment, the formed gel is placed in an oven at a temperature below 100° C., i.e. about 90° C. for at least 24 hrs, so as to discharge the major portion of the solvents and of the water contained in the gel, without causing any foaming or cracking. This treatment is followed by an increase in temperature in the form of a heating ramp between about 90° C. and 180° C. under a primary vacuum (about $10^{-1}$ torrs). The temperature ramp is preferably comprised between 0.1 and 5° C./min. The monolith is maintained for period of several days in vacuo around 180° C.

During the third heat treatment, a new increase in temperature from 180° C. up to a drying temperature is applied. This temperature increase is carried out at a rate comprised between 1 and 50° C./min. After having reached the drying temperature, this temperature is maintained for at least one hour. This drying temperature is preferably comprised between about 850 and 1,000° C. This third treatment may be conducted in vacuo, or at atmospheric pressure. At the end of this step a porous xerogel is obtained.

From the stabilized xerogels prepared according to the method shown hereinbefore, transparent and dense (d=2.2) silica glasses were obtained without any foaming. Foaming appears if the heat treatment is too sudden (fast rise in temperature): the porosity then rapidly closes, trapping water molecules from the condensation process of the silanols. This pressurized water leads to the formation of many microbubbles which deform the material and generate an expansed silica structure. In order to avoid foaming during the fourth heat treatment, the xerogels preferably have to be treated at 1,100° C. for several hours (at least one hour) by using a ramp of about 1° C./min between 850° C. and 1,100° C. The obtained glasses are then transparent.

In a preferred embodiment of the invention, the porous xerogel dried between about 850° C. and 1,000° C. is then dehydrated by means of a fourth heat treatment first under oxygen, and then under a $O_2+Cl_2$ mixture, and again under $O_2$ in order to discharge the residual $Cl_2$. It is then densified at a temperature of about 1,300° C. for several hours. At the end of this treatment, the monoliths are transparent and free of bubbles. In this case, the —OH group concentration as revealed by Fourier transform infrared spectroscopy is strongly reduced, and typically less than 1 ppm.

EXAMPLES

Example 1

A sol is prepared on the basis of TMOS, methanol, $H_2O$, DMF and $NH_4OH$, in a ratio of 1:4:2:1:0.005. The obtained solution is placed in closed cylindrical Pyrex™ receptacles. These containers are placed in an oven at 50° C. for several weeks. The dimension of the monoliths produced in this way is limited to about 10 cm. Beyond this limit, the monolith cracks during aging.

The formed gels (with a centimetric size of the order of 1 to 3 cms) are subsequently treated at 90° C. for 24 hours. This treatment is followed by a treatment under a primary vacuum ($10^{-1}$ torrs): the temperature ramp between 90° C. and 180° C. is 0.1° C./min. The monolith is then maintained in vacuo at 180° C. for 120 hours. After this step, the gel is heated with a temperature ramp of 1° C./min and between 180° and 850° C. The gel is then maintained for one hour at 850° C. in order to obtain a porous xerogel.

Example 2

The parameters are identical with those of Example 1, except for the temperature at the end of dehydration, which is 1,000° C. instead of 850° C. in Example 1.

Examples 3 to 12

| Examples | T (° C.) | Ramp (° C./min) | Comment on the quality of the monolith |
|---|---|---|---|
| 3 | 850 | 1 | intact |
| 4 | 1000 | 1 | intact |
| 5 | 850 | 5 | intact |
| 6 | 1000 | 5 | intact |
| 7 | 850 | 10 | intact |
| 8 | 1000 | 10 | intact |
| 9 | 850 | 50 | intact |
| 10 | 1000 | 50 | intact |
| 11 | 850 | 50 | cracking |
| 12 | 1000 | 50 | cracking |

Comment on Examples 3 to 10

A sol is prepared on the basis of TEOS, ethanol, $H_2O$, DMF and $NH_4OH$, in a ratio of 1:4:2:1:0.005. The obtained solution is placed in closed cylindrical pyrex™ receptacles. These containers are placed in an oven at 50° C. for several weeks. In this case, gel monoliths with dimensions of more than 10 cm were able to be obtained.

The formed gels are subsequently treated at 90° C. for 24 hours. This treatment is followed by a treatment under a primary vacuum ($10^{-1}$ torrs): the temperature ramp between 90° C. and 180° C. is 0.1° C./min. The monolith is then maintained in vacuo at 180° C. for 120 hours. After this step, the gel is heated with a temperature ramp between 1° C./min and 50° C./min, between 180° C. and 850° C. or 1,000° C. The gel is then maintained for one hour at 850° C. or 1,000° C. in order to obtain a porous xerogel. The two variable parameters according to the Examples are defined in the table hereafter. The monolith is then visually inspected.

Examples 11 and 12

Examples 11 and 12 correspond to Examples 3 to 15, except for the treatment between 90 and 180° C. and the maintaining at 180° C., which is carried out at atmospheric pressure and not in vacuo. Cracking is observed therein for significantly lower temperature rise rates, a sign of lower porosity and/or of a more substantial volatile residue.

Example 13

The xerogel of Example 1 is then heated under oxygen at 700° C., and then under a $O_2/Cl_2$ mixture at 900° C. for 2 hours, again under $O_2$ for 3 hours at 1,000° C., and then subject to a ramp of 1° C./min under He in order to bring the monolith to 1,300° C., a temperature at which it is maintained for 2 hours.

At the end of this treatment, the sample is free of bubbles and cracks.

Example 14

The xerogel of Example 2 is then heated under oxygen at 700° C., and then under a $O_2/Cl_2$ mixture at 900° C. for two hours, again under $O_2$ for 3 hours at 1,000° C., and then subject to a ramp of 1° C./min under He for bringing the monolith to 1,300° C., temperature at which it is maintained for 2 hours.

At the end of these treatments, the sample is free of bubbles and cracks.

Example 15

The xerogel of Example 3 is then heated under oxygen at 700° C., and then under a $O_2/Cl_2$ mixture at 900° C. for 2 hours, again under $O_2$ for three hours at 1,000° C., and then subject to a ramp of 1° C./min under He for bringing the monolith to 1,300° C., a temperature at which it is maintained for 2 hours.

At the end of these treatments, the sample is free of bubbles and, cracks.

Example 16

The xerogel of Example 4 is then heated under oxygen at 700° C., and then under a $O_2/Cl_2$ mixture at 900° C. for two hours, and again $O_2$ for three hours at 1,000° C., and then subject to a ramp of 1° C./min under He in order to bring the monolith to 1,300° C., a temperature at which it is maintained for two hours.

At the end of these treatments, the sample is free of bubbles and cracks.

Example 17

The parameters are identical with those of Example 1 except that the treatment between 90 and 180° C. is carried out at atmospheric pressure in air.

Figure 3A:
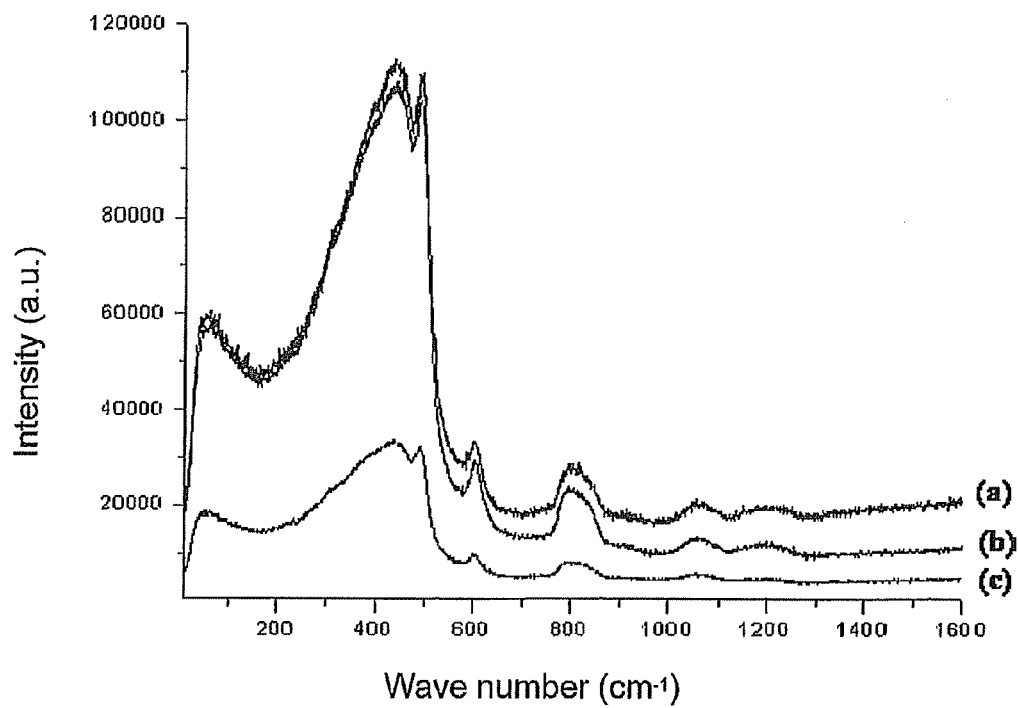
FIG. 3 illustrates the macro-Raman spectra of silica glasses of Examples 15(a), 16(b) and 14(c).
Figure 3B:
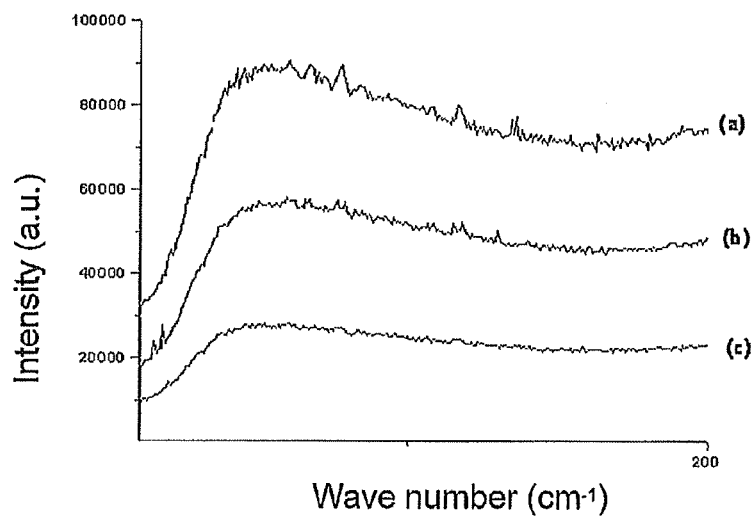

Macro-Raman spectra illustrated in FIG. 3 of the samples 14 to 16 are characteristic of silica glasses. Further, Fourier transform infrared spectroscopies show that the glasses obtained from TEOS and stabilized at 1,000° C. have —OH concentrations of less than 1 ppm, this limit being the detection limit of the measurement device.

Figure 4:
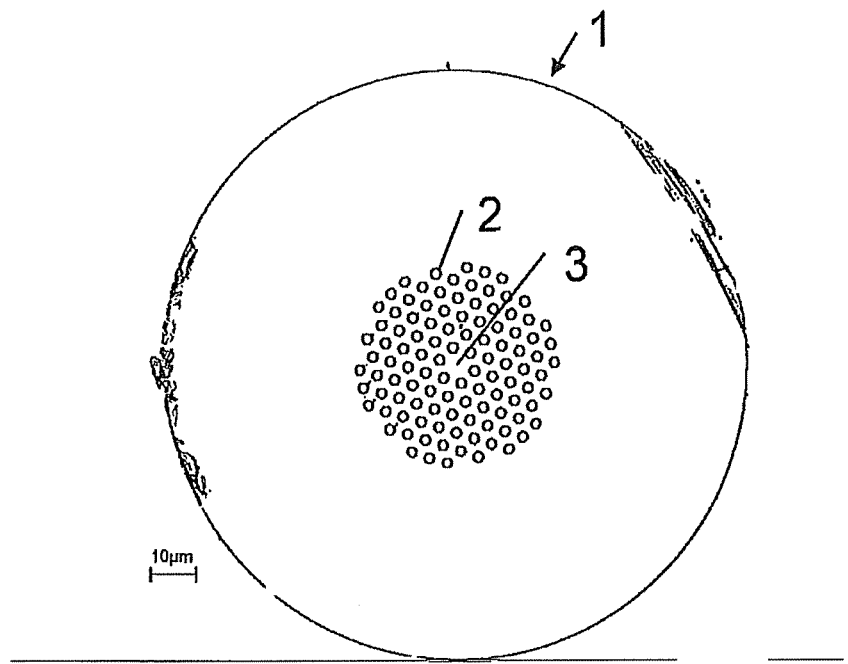
FIG. 4 illustrates a microstructured optical fiber 1, the core 3 of which consists of silica glass produced according to the method of the present invention.
Figure 5:
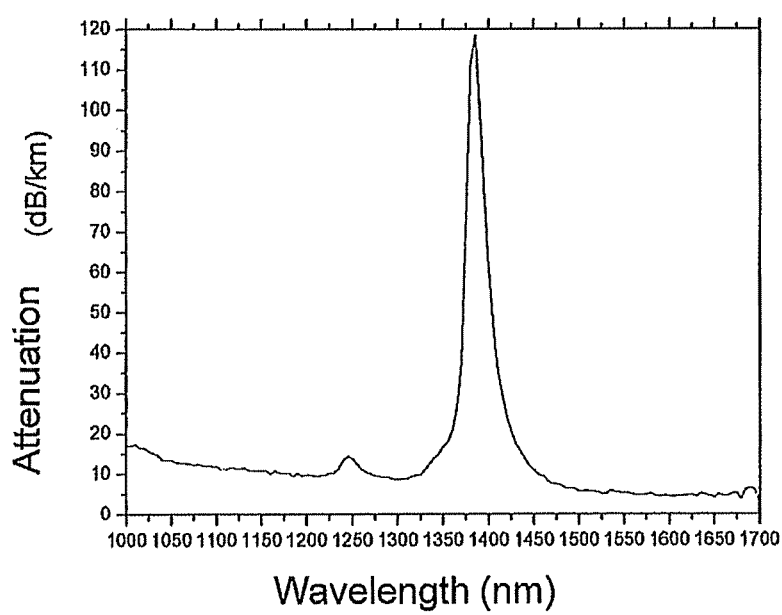
FIG. 5 illustrates the typical attenuation curve obtained for cores of microstructured optical fibers as illustrated in FIG. 4 and comprising a silica core produced by the method according to the present invention.

The drawing of a monolith according to Example 16 in the form of a capillary, and then the assembling of a capillary structure allows the drawing of a microstructured fiber 1 comprising voids 2 (see FIG. 4). The silica glass produced according to the method of the present invention makes up the core 3 of the microstructured fiber. The attenuation of optical signals having a wavelength of about 1,500 nm injected into the core of the assembly is about 5 dB/km. This is about half of what is generally observed on fibers obtained from commercial silica glasses provided for this type of application. The peak observed at 1,400 nm is due to the contamination by hydroxyl groups (—OH) upon assembling the capillaries (surface OH groups).

Figure 6:
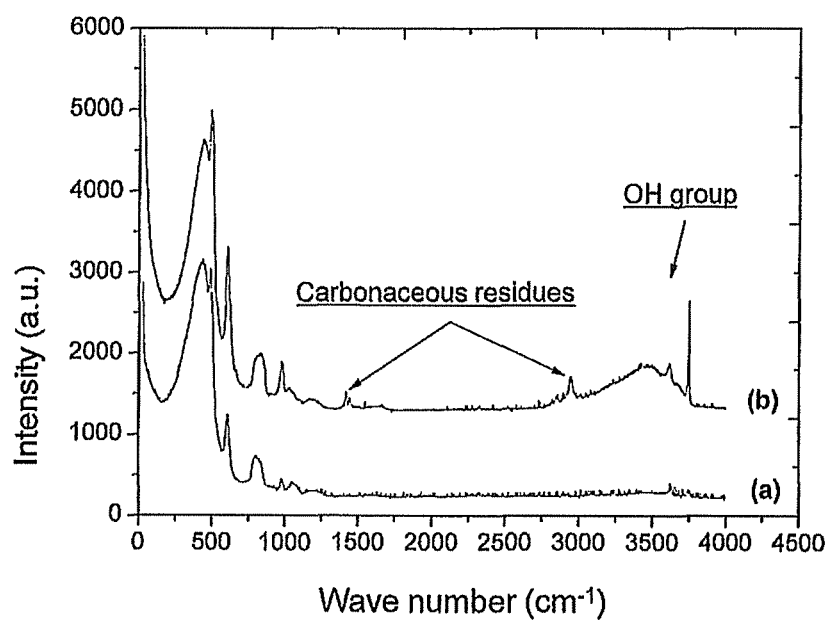
FIG. 6 illustrates the macro-Raman spectra obtained on the samples of Examples 1 and 17.

FIG. 6 shows that, in the case of the untreated monolith in vacuo at 180° C., the Raman spectrum has additional bands (curve (b), Example 17) as compared with the one which was treated in vacuo (curve (a), Example 1). Two bands located around 1430, 2944 $cm^{-1}$ are characteristic of organic residues. A wide band between 3,000 and 3,800 $cm^{-1}$, characteristic of —OH groups is also present in the case of sample 17.

Thus, the heat treatment in vacuo at 180° C. allows better removal of the organic residues and of the —OH groups in the monoliths.

The invention claimed is:

1. A method for synthesis of a silica monolith according to a sol-gel process including the following steps:
   hydrolyzing a silicon alkoxide in order to form a hydrolyzed precursor followed by condensing said hydrolyzed precursor in the presence of an organic solvent, in the presence of water and a basic catalyst in order to form oligomeric clusters containing several silicon atoms;
   dispersing said oligomeric clusters in a solution in order to form a sol;
   polymerizing the sol in order to obtain a gel by a first heat treatment, at a temperature below the boiling temperature of the constituents of the sol;
   drying the gel by a second heat treatment including exposure of the gel to about 90° C. for at least 24 hours followed by an increase in temperature in vacuo between about 90° C. and about 180° C., said increase in temperature being comprised between 0.1° C./min and 5° C./min;
   transforming the gel into a xerogel by a third heat treatment, said third heat treatment including a hold at a drying temperature comprised between 850 and 1,000° C. for at least one hour;
   dehydrating and densifying the xerogel until a silica monolith is obtained by a fourth heat treatment, said fourth heat treatment comprising a hold at a dehydrating and densifying temperature above 1,100° C. for at least one hour.

2. The method according to claim 1 wherein the shape of the silica monolith is set at the step of said polymerizing of the sol.

3. The method according to claim 1, wherein said basic catalyst includes $NH_4OH$.

4. The method according to claim 1, wherein the silicon alkoxide is selected from one of tetraethyloxysilane and tetramethyloxysilane.

5. The method according to claim 1, wherein the organic solvent is selected from one of ethanol and methanol.

6. The method according to claim 1, wherein said solution further includes a drying additive comprising dimethylformamide.

7. The method according to claim 1, wherein the constituents for forming the sol are present in the proportions:
   silicon alkoxide/organic solvents/$H_2O$/dimethylformamide/$NH_4OH$ of 1/4/2/1/0.005.

8. The method according to claim 1, wherein said second heat treatment further comprises a hold at about 180° C. in vacuo for at least 120 hrs.

9. The method according to claim 1, wherein the third heat treatment further comprises a temperature increase ramp from about 180° C. until dehydration and densification of the xerogel, said temperature increase being comprised between 1 and 50° C./min.

10. The method according to claim 1, wherein the fourth heat treatment further includes purging in the presence of an $O_2/Cl_2$ mixture and vitrifying in the presence of helium.

11. The method according to claim 1, wherein the fourth heat treatment comprises a ramp of at least 1° C./min between said drying temperature and said dehydrating and densifying temperature.

12. The method according to claim 10, wherein the fourth heat treatment further comprises a hold at a constant temperature of about 1,300° C. for at least one hour.

13. The method according to claim 1, wherein said xerogel has an average porosity comprised between 5 nm and 23 nm.

14. The method according to claim 1, wherein said xerogel has an average porosity of 5 nm when the latter is obtained from tetramethyloxysilane.

15. The method according to claim 1, wherein said xerogel has an average porosity of 23 nm when the latter is obtained from tetraethyloxysilane.

* * * * *